Feb. 17, 1953  R. W. BAILEY ET AL  2,628,646
DRIVING AND ALIGNING MEANS FOR POWER-OPERATED TOOLS
Filed June 30, 1949  2 SHEETS—SHEET 1

INVENTORS.
ROY W. BAILEY.
JOHN THOMAS FAULL.
BY
*Samuel Wesman*
ATTORNEY.

Feb. 17, 1953 R. W. BAILEY ET AL 2,628,646
DRIVING AND ALIGNING MEANS FOR POWER-OPERATED TOOLS
Filed June 30, 1949 2 SHEETS—SHEET 2

INVENTORS
Roy W. Bailey
John Thomas Faull
BY Samuel Wiseman
ATTORNEY.

Patented Feb. 17, 1953

2,628,646

UNITED STATES PATENT OFFICE 2,628,646

DRIVING AND ALIGNING MEANS FOR POWER-OPERATED TOOLS

Roy W. Bailey and John T. Faull, Detroit, Mich., assignors to Detroit Power Screwdriver Company, Detroit, Mich., a corporation of Michigan Application June 30, 1949, Serial No. 102,344

6 Claims. (Cl. 144—32)

1

The present invention pertains to a novel two-part spindle for rotating and driving certain pieces to be assembled on other members. In the disclosed example the spindle is used for driving nuts but it also may be used, with proper modification of the bit, for driving screws or other pieces that require a turning motion.

The spindle comprises two axially alined parts, one of which is a constantly propelled driving member, with an intervening clutch. The other part is driven and carries the bit or tool that engages and drives the nut or other piece.

In the case of a nut driver, the driven spindle member is initially in a retracted and stationary position to have a nut injected therein. After the nut has been injected, the driven spindle member is brought against the work piece on which the nut is to be assembled. As the driven spindle member meets resistance or load in this manner, the aforementioned clutch becomes engaged to effect a driving connection between the drive and driven members of the spindle assembly.

In this operation the invention fulfills two principal objects. First, the driven spindle member in its retracted and stationary position must always assume the same radial or angular relation to a fixed, non-rotating radius for constant alinement of the bit for engagement with the nut or other piece to be applied thereto. For this purpose a stop on the driven spindle member engages a properly located stop or dog on a fixed part of the machine structure.

The second object is to impart a high speed of rotation to the driven spindle member before the abovementioned clutch becomes engaged. Otherwise, if the nut started to rotate only on engaging the fixed work piece, there would be danger of stripping the threads. This difficulty is avoided by providing a constantly engaged, light frictional driving member between the two spindle members, for initiating rotation of the driven spindle member as soon as its stop member disengages the fixed stop member. This light drive is not adequate to turn the driven spindle under load. When the nut meets resistance by engaging the fixed work piece, the main driving clutch becomes engaged, as above set forth.

Still another function is derived from the light frictional drive. When the nut has been driven and the driven spindle member is retracted for another loading, the light drive on this member assures interengagement of the two stops to bring the bit into proper alinement for receiving the next nut.

2

The invention is fully disclosed by way of example in the following description and in the accompanying drawings in which—

Figure 1:
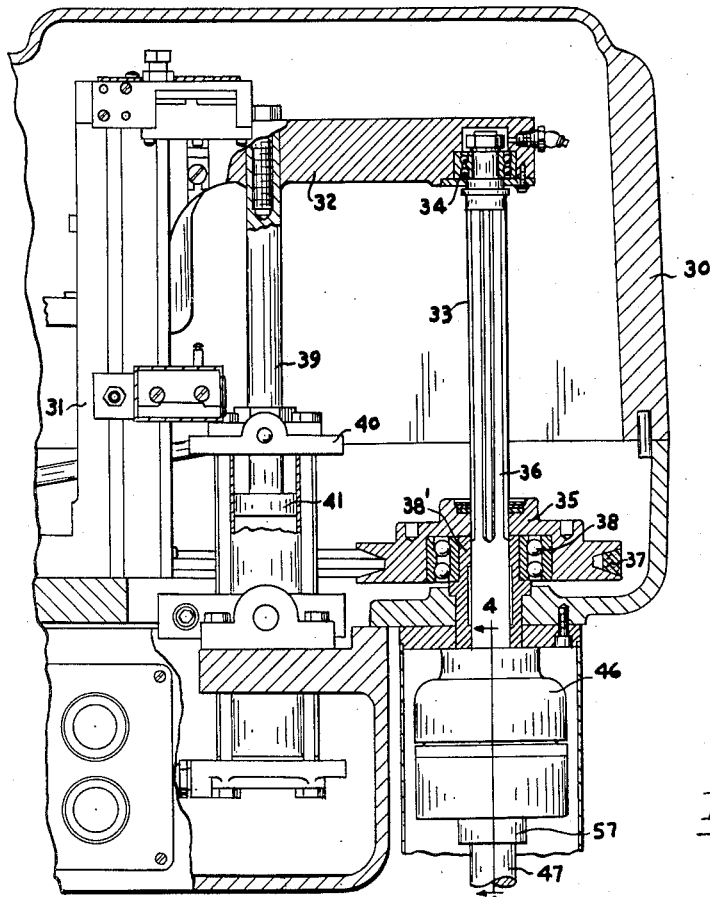
Figure 1 is a vertical section of the device.
Figure 2:
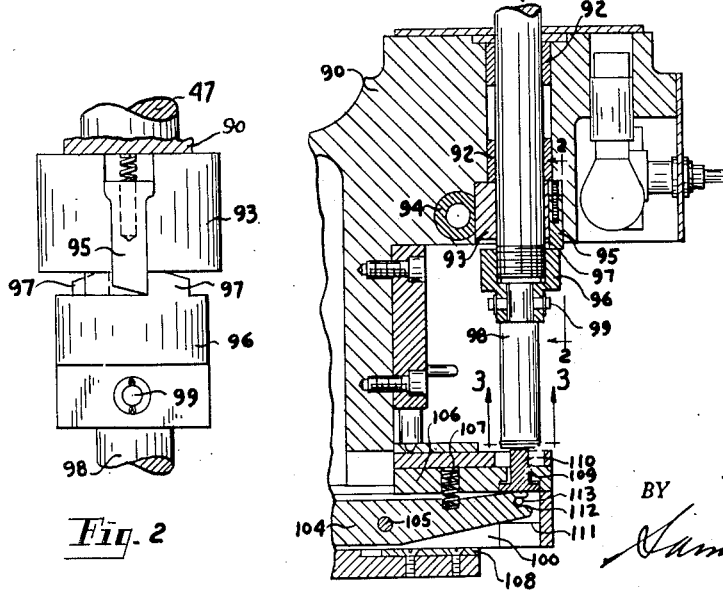
Figure 2 is an elevation on the line 2—2 of Figure 1.
Figure 3:
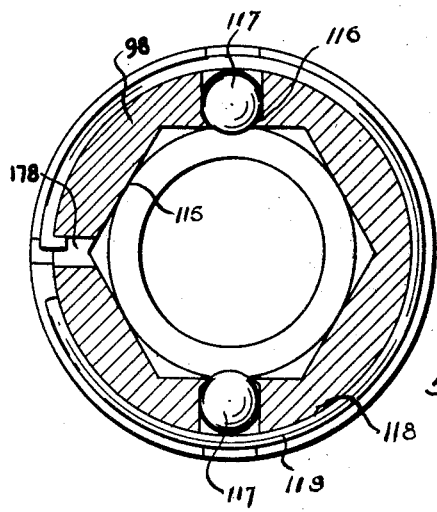
Figure 4:
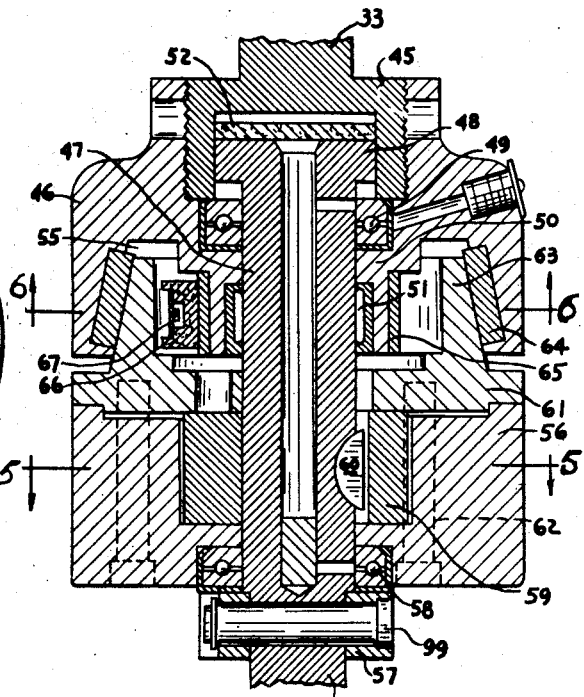

Figures 3 and 4 are sections on the lines 3—3 and 4—4 of Figure 1, and

Figure 5:
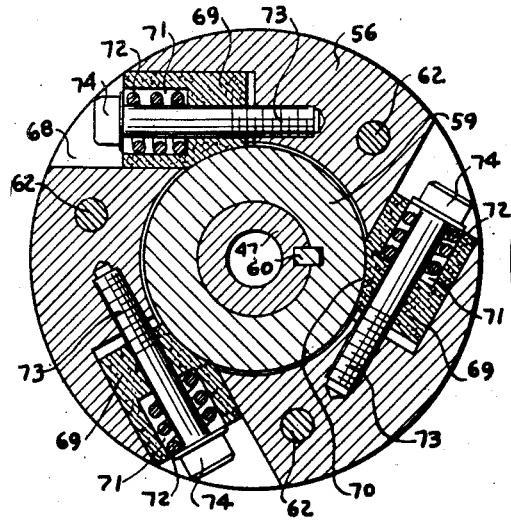
Figure 6:
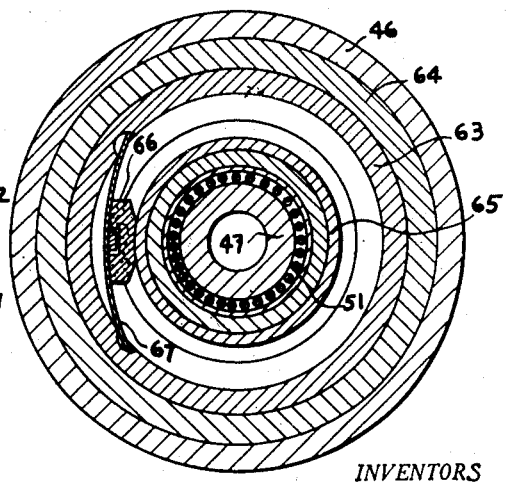

Figures 5 and 6 are sections on the lines 5—5 and 6—6 of Figure 4.

Reference to these views will now be made by use of like characters which are employed to designate corresponding parts throughout.

In Figure 1 is shown the fixed frame structure 30 of a machine in which is mounted a guide or track 31. On the track is slidably mounted a projecting arm 32 from which is suspended a drive spindle member 33 by suitable means such as a bearing 34.

The member 33 is constantly driven by any suitable means. For example, a pulley 35 engages in splines 36 on the spindle member and is engaged by a belt 37 driven from a power source as in our copending U. S. Patent No. 2,616,324, of November 4, 1952. A ball bearing 38 is preferably inserted between the pulley and a bushing 80 on the spindle.

The drive spindle member 33 is reciprocated as required by a rod 39 extending from the end of a cylinder 40. Within the cylinder, the rod carries a piston 41 which is operated by a pressure fluid and control valves, as also disclosed in our copending application.

For the purpose of the present description, the member 33 will be called the upper spindle, and it will be assumed to have vertical reciprocation. The lower end of the upper spindle is enlarged and threaded at 45 to receive an upper clutch housing 46. A lower spindle 47 is suspended by a head 48 on its upper end resting on a thrust bearing 49 which lies on a shoulder 50 formed in the housing 46. The housing also contains a needle bearing 51 engaging the upper portion of the lower spindle. A felt retainer 52 for oil is inserted in the head 48.

The bottom of the housing 46 is formed with a conical recess 55. At a lower position on the lower spindle is mounted another housing 56 resting on a stop collar 57 secured on the lower spindle, with a thrust bearing 58 inserted in the lower housing to engage the collar. Within the housing 56 is a clutch friction collar 59 keyed at 60 to the lower spindle for a purpose that will presently appear. Upon the housing 56 is a clutch member 61 secured by studs 62.

The member 61 is formed with a conical clutch ring 63 received in the cavity 55. A hard steel ring 64 is pressed in the lower end of the member 46 at the outer wall of the recess 55. The inner wall of the recess 55, around the needle bearing 51, is fitted with a sleeve 65. The sleeve is engaged by a fiber friction block 66 which is backed by a flat compressed spring 67 firmly engaging or secured to the clutch member 63. This constitutes a constant, light friction drive between the member 46 and the adjacent cylindrical wall of the member 61.

The member 56 is formed with a series of recesses 68 at suitable intervals. In each recess is placed a fiber friction plug 69 which is modified to form an arcuate surface 70 engaging the periphery of the friction collar 59. The plugs are counterbored to form a cavity 71 in which is seated a coil spring 72. A stud 73 is passed through each recess and is screwed into the body of the member 56. One end of the spring bears against the friction plug and the other end against the head 74 of the stud, whereby the friction plugs are held edgewise in frictional engagement with the clutch friction collar 59. The plugs constitute a slip connection between the drive and driven elements of the clutch, to avoid breakage in case of binding of the driven member for any reason.

A lower portion 90 of the frame structure contains bearings 92 through which the lower spindle passes. The lower spindle also passes through a bushing 93 secured in the part 90 by a plug 94. In the bushing 93 is axially mounted a dog or pawl 95 backed by a coil spring 95' for a yielding movement downward to a limited extent. On the lower end of the spindle 47 is secured a complementary stop and adapter 96 formed on its upper end with a pair of diametrically opposed teeth or dogs 97 for selectively engaging the dog 95. A bit or wrench 98 for receiving nuts is held in the adapter by a pin 99. The bit or wrench is representative of a tool designed to engage and rotate a work piece.

Beneath the bit is a horizontal slide 100 in which is pivotally mounted an arm 104 on a pin 105. The slide carries a guide plate 106 over the arm and receives a coil spring 107 that bears downward on the arm. Beneath the arm a wear plate 108 is removably attached to the floor of the slide 100.

The guide plate 106 is formed with a shouldered opening 109 in which is slidably mounted a shouldered injector pin 110. Beneath the plate 106, the pin 110 is slotted at 111 to receive the forward end of the lever 104. This end is forked at 112 to receive a cross pin 113 that bridges the slot 111.

As described in the aforementioned patent, the slide is retracted to move the pin 110 laterally out of the axis of the bit 98. A nut is then delivered upon the slide, over the pin 110, and the slide is then returned to the position in which the pin 110 is co-axial with the bit 98. The arm 104 is then rocked, whereby the pin injects the nut into the bit.

The bit 98 is interchangeable with others for various sizes of pieces. The lower end of the selected bit is recessed at 115 according to the nut being handled. At the sides of the recess are formed seats 116 which receive balls 117 extending somewhat into the recess. The outer wall of the bit is grooved at 118 to receive a wire spring 119 for holding the balls on their seats. The nut is injected while the bit is held stationary by the interengagement of the dogs 95, 97, and the recess 115 alined with the nut. The slide and injector are then withdrawn, leaving a space for the loaded bit to be moved down to the work.

With reference again to the operation of the clutch and bit, the interengaging members 95 and 97 retain the bit 98 in the same radial or angular position whenever the lower spindle is stopped. Thus, a non-circular work engaging member, such as the bit 98 with its socket 115 always has the same relation, in the stationary position, to a given fixed radius and is always properly alined for insertion of a nut.

On the downward or nut-driving stroke, the lower spindle is first driven lightly by the friction member 66 and is accelerated to a substantial speed before the nut engages the piece on which it is to be screwed. This action avoids stripping of the threads, which would be likely to occur if the nut started to engage from zero or low speed of rotation. When the engagement occurs, there is resistance to continued downward movement of the driven spindle, and this resistance or load causes engagement of the main driving clutch 63, 64.

On the retraction of the spindle after the nut has been driven, the main clutch disengages by the weight of the driven spindle. The friction member 66 is still operative on the driven spindle and assures rotation of the latter to make a full engagement of one of the dogs 97 with the non-rotating dog 95 for the properly alined loading position of the bit, as previously set forth.

Although a specific embodiment of the invention has been illustrated and described, it will be understood that various alterations in the details of construction may be made without departing from the scope of the invention as indicated by the appended claims.

What we claim is:

1. A two-stage spindle assembly comprising a driving spindle, a driven spindle alined therewith and movable axially thereof, a frictional member carried by one of said spindles and having a slip driving connection with the other spindle, and complementary clutch elements carried by said spindles and engageable with each other on relative movement of the spindles toward each other, a dog mounted non-rotatably adjacent to said driven spindle, and a stop member carried by said driven spindle and engageable with said dog.

2. A two-stage spindle assembly comprising a driving spindle, a driven spindle alined therewith and movable axially thereof, a frictional member carried by one of said spindles and having a slip driving connection with the other spindle, and complementary clutch elements carried by said spindles and engageable with each other on relative movement of the spindles toward each other, a fixed structure adjacent to said driven spindle, a spring-backed dog mounted non-rotatably in said fixed structure, and a stop member carried by said driven spindle and engageable with said dog.

3. A two-stage spindle assembly comprising a driving spindle and tool, a driven spindle alined therewith and movable axially thereof, a frictional member carried by one of said spindles and having a slip driving connection with the other spindle, and complementary clutch elements carried by said spindles and engageable with each other on relative movement of the spindles toward each other, a work-engaging member on the free end of said driven spindle, the work-engaging portion of said member being non-circular, means for loading said work-engaging member, a dog mounted non-rotatably adjacent to said driven spindle, and a stop member carried by said driven spindle and engageable with said dog, whereby to stop said work-engaging member in a constant position relatively to a fixed radius.

4. A two-stage spindle assembly comprising a driving spindle and tool, a driven spindle alined therewith and movable axially thereof, a frictional member carried by one of said spindles and having a slip driving connection with the other spindle, and complementary clutch elements carried by said spindles and engageable with each other on relative movement of the spindles toward each other, a fixed structure adjacent to said driven spindle, a spring-backed dog mounted non-rotatably in said fixed structure, and a stop member carried radially by said driven spindle and engageable with said dog, a work-engaging member on the free end of said driven spindle, the work-engaging portion of said member being non-circular, means for loading said work-engaging member, a dog mounted non-rotatably adjacent to said driven spindle, and a stop member carried by said driven spindle and engageable with said dog, whereby to stop said work-engaging member in a constant position relatively to a fixed radius.

5. A two-stage spindle assembly comprising a driving spindle, a driven spindle alined therewith and movable axially thereof, a frictional member carried by said driving spindle and having a slip connection with the other spindle, and complementary clutch elements carried by said spindles and engageable with each other on relative movement of the spindles toward each other, a dog mounted non-rotatably adjacent to said driven spindle, and a stop member carried by said driven spindle and engageable with said dog.

6. A two-stage spindle assembly comprising a driving spindle, a driven spindle alined therewith and movable axially thereof, a light spring carried by said driving member and exerting pressure toward said driven member, a frictional member carried by said spring and lightly engaging said driven member, and complementary clutch elements carried by said spindles and engageable with each other on relative movement of the spindles toward each other, a dog mounted non-rotatably adjacent to said driven spindle, and a stop member carried by said driven spindle and engageable with said dog.

ROY W. BAILEY.
JOHN T. FAULL.

REFERENCES CITED

The following references are of record in the file of this patent:

UNITED STATES PATENTS

| Number | Name | Date |
|---|---|---|
| 396,597 | Philips | Jan. 22, 1889 |
| 981,010 | Schoonmaker | Jan. 10, 1911 |
| 1,007,977 | Robinson | Nov. 7, 1911 |
| 1,564,342 | Gebhardt et al. | Dec. 8, 1925 |
| 1,793,236 | Mac Donough | Feb. 17, 1931 |
| 2,216,703 | Ericson | Oct. 1, 1940 |
| 2,359,982 | Flinn | Oct. 10, 1944 |